United States Patent
Leach (10) Patent No.: US 11,158,019 B2
(45) Date of Patent: Oct. 26, 2021

(54) AUTOMATING MATERIAL DELIVERY AND REPLENISHMENT

(71) Applicant: Halliburton Energy Services, Inc., Houston, TX (US)

(72) Inventor: Nathan P. Leach, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 129 days.

(21) Appl. No.: 16/331,914

(22) PCT Filed: Dec. 8, 2016

(86) PCT No.: PCT/US2016/065636
§ 371 (c)(1),
(2) Date: Mar. 8, 2019

(87) PCT Pub. No.: WO2018/106245
PCT Pub. Date: Jun. 14, 2018

(65) Prior Publication Data
US 2019/0206007 A1    Jul. 4, 2019

(51) Int. Cl.
G06Q 10/06 (2012.01)
G06Q 50/28 (2012.01)
(Continued)

(52) U.S. Cl.
CPC ............ G06Q 50/28 (2013.01); G06F 16/23 (2019.01); G06Q 10/04 (2013.01);
(Continued)

(58) Field of Classification Search
USPC ...................................................... 705/7.22
See application file for complete search history.

(56) References Cited

U.S. PATENT DOCUMENTS 5,983,198 A * 11/1999 Mowery ............... G06Q 10/08
705/22
6,477,660 B1  11/2002 Söhner
(Continued)

FOREIGN PATENT DOCUMENTS

AU   2007302772 B2   7/2013
CA      2933468 A1   9/2015
(Continued)

OTHER PUBLICATIONS

Williams et al. (Predicting retailer orders with POS and order data: The inventory balance effect, European Journal of Operational Research vol. 232, Issue 3, Feb. 1, 2014, pp. 593-600).*
(Continued)

*Primary Examiner* — Matthew D Henry
(74) *Attorney, Agent, or Firm* — Polsinelli PC (57) ABSTRACT

A big data technique is used to obtain from a database a plurality of historical data regarding a consumable material deployed to perform a plurality of instances of a job. An estimated amount of consumable material required to perform the job based on the plurality of historical data is determined. An optimal delivery schedule based on the estimated amount of consumable material required to perform the job, the location of the job, real-time route congestion telemetry and real-time consumption telemetry for the job is predicted. The estimated amount of consumable material following the optimal delivery schedule is delivered. The data regarding the delivery and consumption of the consumable material on the job is received in real-time. The real-time delivery and consumption data is used to update the database.

17 Claims, 4 Drawing Sheets

(51) Int. Cl.
  *G06Q 10/08* (2012.01)
  *G06Q 10/04* (2012.01)
  *G06F 16/23* (2019.01)

(52) U.S. Cl.
  CPC . *G06Q 10/06312* (2013.01); *G06Q 10/06315* (2013.01); *G06Q 10/087* (2013.01)

(56) References Cited

U.S. PATENT DOCUMENTS

| | | | |
|---|---|---|---|
| 7,457,763 | B1 | 11/2008 | Garrow et al. |
| 7,561,069 | B2 | 7/2009 | Horstemeyer |
| 7,860,738 | B2 | 12/2010 | Simon et al. |
| 9,256,852 | B1* | 2/2016 | Myllymaki ............. B60P 3/007 |
| 2003/0164426 | A1 | 9/2003 | Clair et al. |
| 2003/0233264 | A1 | 12/2003 | Jones et al. |
| 2008/0275582 | A1 | 11/2008 | Nettles et al. |
| 2010/0205044 | A1 | 8/2010 | Scheer |
| 2010/0241484 | A1* | 9/2010 | Nichols ................ G06Q 10/087 705/7.13 |
| 2012/0288328 | A1 | 11/2012 | Minich |
| 2013/0068833 | A1* | 3/2013 | Matityaho ............ G06Q 10/087 235/375 |
| 2014/0046512 | A1 | 2/2014 | Villamar |
| 2014/0180749 | A1* | 6/2014 | Woodward ....... G06Q 10/06314 705/7.24 |
| 2015/0006005 | A1* | 1/2015 | Yu .......................... G06Q 50/28 701/22 |
| 2015/0127137 | A1* | 5/2015 | Brandt ................... B23K 26/38 700/166 |
| 2016/0104099 | A1 | 4/2016 | Villamar |

FOREIGN PATENT DOCUMENTS

| | | |
|---|---|---|
| CN | 1216621 A | 5/1999 |
| EP | 1156434 B1 | 2/2003 |
| EP | 2115575 A1 | 11/2009 |
| JP | H07185469 A | 7/1995 |
| WO | 2008042064 A1 | 4/2008 |
| WO | 2008088817 A1 | 7/2008 |
| WO | 2011160006 A1 | 12/2011 |

OTHER PUBLICATIONS

English (Machine) Translation of patent No. CN1216621A—Integrated system monitoring use of materials, controlling and monitoring delivery of materials and providing automated billing of delivered materials—Google Patents.
English (Machine) Translation of patent No. EP1156434A1—Device and method for automating the resource and operating material management of an analysis instrument—Google Patents.
English (Machine) Translation of patent No. EP2115575A1—Shipping, tracking and delivery networks, apparatus and methods—Google Patents.
English (Machine) Translation of patent No. JP H07185469 A, Method and apparatus for delivery matter automatic order dividing and assembling, Google Patents.
International Searching Authority, Patent Cooperation Treaty, International Search Report and Written Opinion, International application No. PCT/US16/65636, entire document, which is a PCT parent of the instant application; dated Aug. 31, 2017.
Canadian Examination Report, Application No. 3,034,238, dated Nov. 20, 2020.

\* cited by examiner

FIG. 4

AUTOMATING MATERIAL DELIVERY AND REPLENISHMENT

BACKGROUND

Actively monitoring the deployment and consumption of consumable material to various job locations while adjusting a schedule for that deployment in real time is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Efficiently deploying consumable material to various locations to perform jobs at those locations requires historical information, logistical management, and contingency planning. Many unknown variables or events can affect the deployment of the material to the various locations. Those unknown variables or events may also affect the performance of jobs at those locations if the materials are not available as required or not timely delivered. Some of the variables to consider when planning a schedule for deploying consumable materials (i.e., a deployment schedule) may include (1) introducing time savings in staging and/or transporting consumable materials as part of a pre-job setup, (2) efficiently distributing consumable materials to job sites thereby preventing some sites from being starved of consumable materials when other sites have a surplus of the consumable materials, and (3) efficiently delivering material to job sites by monitoring the consumption rate of consumable materials while the jobs are being performed.

Logistically managing the delivery of consumable materials to various locations can be conceptualized using several logical layers. The logical layers conceptualize an efficient method by which consumable materials of any type can be delivered to a location where a job is being performed.

Figure 1:
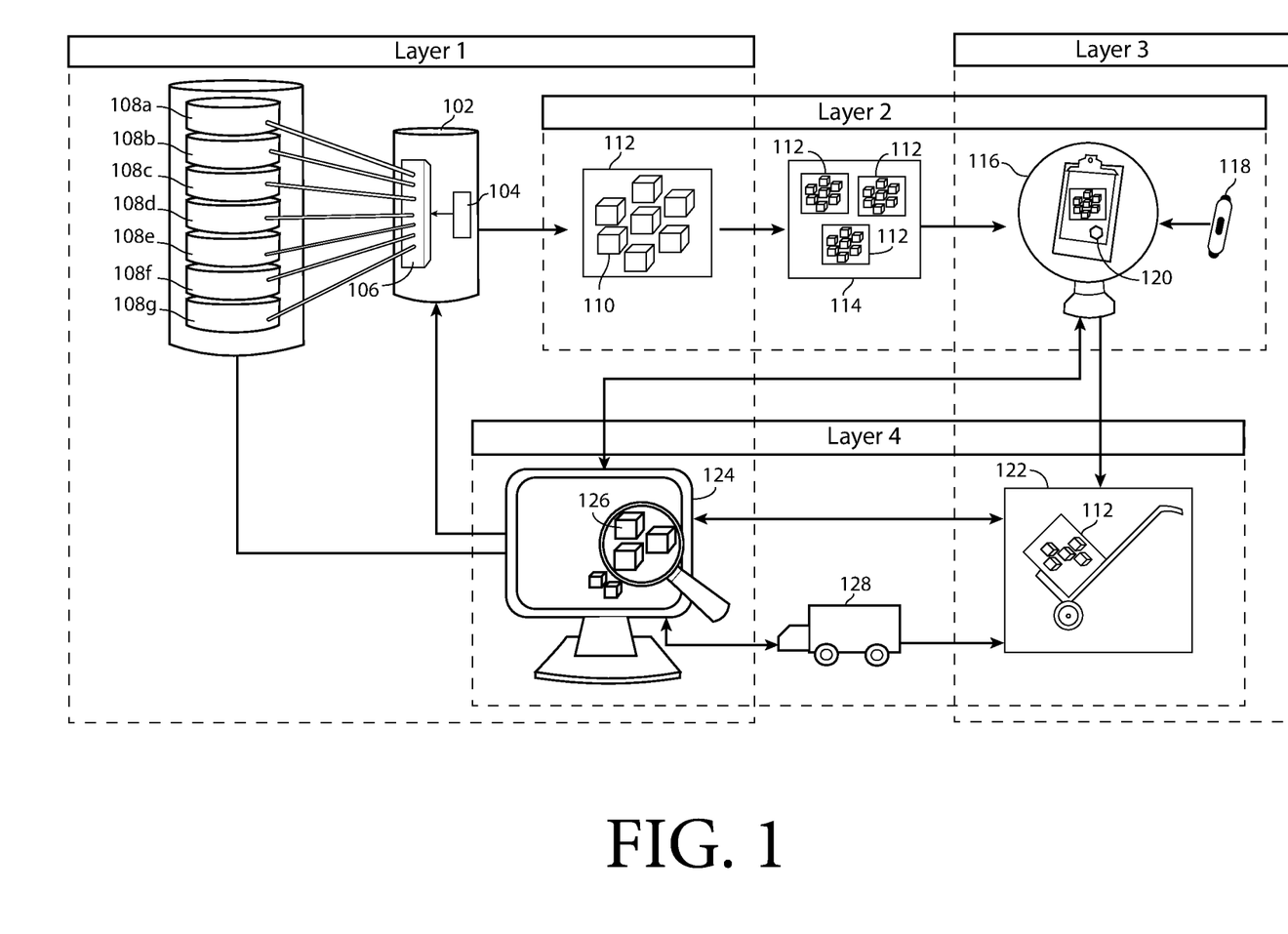
FIG. 1 is a diagram showing a method of deploying consumable material and adjusting a deployment schedule in real time.

FIG. 1 is a diagram showing a method of deploying consumable material and adjusting the deployment schedule in real time. Layer 1 (illustrated by the dashed box labeled Layer 1) is the predictive model and historical analysis stage. Layer 1 includes a database 102. The database 102 may be a relational database that is accessed using a Structured Query Language (SQL). In one or more embodiments, the database 102 is a non-relational database (i.e., a "NoSQL" database, sometimes called "non SQL," "non-relational," or "not only SQL") and may be or include a distributed file system (DFS) that stores unstructured, semi-structured, and structured data. The database 102 may include software (or an algorithm) 104 that performs a big data technique 106 to obtain from a plurality of data stores 108*a-g* a set of historical data 110 regarding a consumable material 112. It will be understood that the plurality of data stores 108*a-g* may contain historical data 110 regarding a plurality of consumable materials 112. The software 104 may perform other techniques as required to gather information from the data stores 108*a-g*. Note, for simplicity only one historical data 110 is labeled.

All of the data stores 108*a-g* may be stored in a single database. Alternatively, each of the data stores 108*a-g* may also be its own database. The data stores 108-*g* may be a DFS that stores unstructured, semi-structured, and structured data. Each of the data stores 108*a-g* may also be physical devices (such as hard drives) that can store a variety of information, such as document files, video and audio files, metadata information, etc.

In layer 1, parameters of historical jobs (i.e., historical data 110) are used to find similarities in historical jobs to predict quantities of consumable materials 112 required for the job or jobs being planned. The parameters of the historical jobs are also used to predict the rate at which those consumable materials 112 are expected to be consumed for the jobs being planned. This prediction produces an estimated amount of consumable material required to perform the jobs 114 (described in more detail in connection with layer 2, discussed below). Several aspects of job execution can be considered for analysis. Those aspects may include (for each job): (1) the job location and physical properties (i.e., coastal, desert, hilly, etc.) of the location, (2) the job environment (i.e., weather, population characteristics, road conditions, crime statistics, etc.), (3) the purpose of the job (drilling, workover, fracking, etc.), (4) the personnel (professional, unskilled labor, etc.) involved in the job, (5) the specific equipment and equipment types used for the job (i.e., drilling rigs, workover rigs, fracking trucks, etc.), and (6) the consumable materials, quantities, rates of consumption, and equivalent substitution materials used for the job, and other aspects. Note, this is not to be interpreted as an exhaustive list, but may include many other aspects of job execution not mentioned above. This analysis can also be used to provide a semi-deterministic method (i.e., a method in which minimal assumptions are required to arrive at a solution) of estimating the quantify of consumable materials 112 required for a given period of time. The minimal assumptions of the job to be performed, in one embodiment, are combined with analysis of historical performance to give a semi-deterministic method. The semi-deterministic method may also be known as an "educated guess."

Layer 2 is the stage in which the predicted quantities of consumable material and delivery economics is determined. Layer 2 overlaps with layer 1 (discussed above) and layer 3 (discussed below). Specifically, layer 2 includes determining the estimated amount of consumable material required to perform the jobs 114 based on the plurality of historical data 110. Although FIG. 1 depicts three consumable materials 112, it is not to be interpreted to be limited to that number, but may be more or less than illustrated.

In situations in which there is a group of scheduled jobs (i.e., deploying the consumable materials 112 to several locations), the analysis described in connection with in layer 1 to create the estimated amount of consumable material required to perform the jobs 114 can use as inputs planned job parameter data as well as a set of transient data (i.e., data from a sample of variables at a given moment of time), which may include: (1) inventory quantity and location of available consumable materials 112, (2) per-location replenishment time of a consumable material 112, (3) pickup and delivery vehicles/methods available per location, and (4) loading/unloading times per delivery vehicle/method type available.

Additional semi-transient data (i.e., data that does not change very often or changes over long periods of time) can also be used as part of the input, which may include: (1) periodic update and acceptable replacement materials (i.e., additional consumable material 112), (2) scaling factors for replacement materials, and (3) economic weight factors for replacement materials.

The analysis in layer 2 estimates the optimal initial quantities of consumable materials 112 required per job site while considering the expected rate of consumption and the capability of replenishing the materials before a job location exhausts the on-hand quantity of consumable materials 112. The inventory location and available delivery methods of each location are used to determine the most economical method of staging the initial quantity of consumable material 112 at a job location.

Layer 3 uses real-time consumption telemetry to enhance the analysis. Prediction of a delivery schedule 116 for each job is based on the estimated amount of consumable material required to perform the job 114, the location of the job, real-time route congestion telemetry, and real-time consumption telemetry for the job. Using the capabilities described in connection with layer 1 and layer 2 (illustrated as the overlapping dashed boxes labeled Layer 1, Layer 2, and Layer 3), the additional capability of receiving real-time telemetry from sensors and work-supplied data 118 can be used as transient data inputs to (for each job): (1) plot the rate of consumption of consumable material 112 against the estimated requirement quantity for the job to forecast the variance of the quantity that will be consumed, (2) monitor the remaining quantity of consumable materials 112 at the job location, the material consumption rate, and other job-related data (such as a halt in job execution due to equipment/personnel failures), (3) combine the monitored telemetry (i.e., real-time telemetry from sensors and work-supplied data 118) and user-supplied data to predict when supplies of consumable materials 112 will be exhausted at a job location, and (4) use inventory and location data for consumable materials 112 along with the predicted exhaustion of supplies to create the delivery schedule 116 for consumable materials 112 at the job location. Some examples of sensors that can be tagged to consumable material 112 to allow real time monitoring of locations and quantities of such materials may include a radio frequency identification device (RFID) or in other embodiments, a global positioning system (GPS).

Layer 3 can also consider the economics of delivery of a consumable material 112 to each location to compare the economic impact of work stopping due to lack of consumable materials 112. In some cases, the time delay for the delivery of replenishments may be more economical than delivering materials from the closest source. Other economic factors may also be considered. For example, the delivery schedule 116 may also include a contingency plan 120 based on real-time emergencies, such as earthquakes, terrorism, absentee employee, breach of agreements, etc., or historically known factors, such as rainy seasons, daylight periods (or the lack thereof, such as in the far north in winter or the far south in summer), etc. The contingency plan 120 may also be based on the estimated amount of consumable material required to perform the job 114, the location of the job, real-time route congestion telemetry, real-time consumption telemetry for the job, personnel available during the execution of the job, and other unknown events that may occur during the execution of the job.

Initiating and executing delivery of the consumable material 112 is illustrated in layer 4. In layer 4, the determined material (i.e. the selected consumable material 112) is delivered following the delivery schedule 116. Information about the delivery 122 and consumption of the consumable material 112 is received in real-time by a monitoring system 124, and is stored as real-time delivery and consumption data 126. The monitoring system 124 may be a personal digital assistant (PDA), a video monitoring system, feeds from a delivery service, or feeds into a software program. The software program may update a data store or data base. The software program's updates may be based on general reports regarding failure of equipment used for the job and reports regarding failures of personnel used for the job.

The real-time delivery and consumption data 126 stored by monitoring system 124 is updated into the database 102. The real-time delivery and consumption data 126 may also be updated to the plurality of data stores 108a-g. In one or more embodiments, the real-time delivery and consumption data 126 is used to update the delivery schedule 116 so that information about the delivery 122 can be adjusted in real-time.

Using the capabilities described in connection with layer 1 to layer 3, a processor (such as the monitoring system 124) interfaces with a fleet of autonomous vehicles 128 to initiate and execute the delivery of consumable materials 112, which may include utilizing equipment that loads, transports, and unloads materials. The time when the delivery 122 is executed can be fed back into layer 3 (represented by the arrow from block 128 to block 122) as another stream of telemetry can be used in predicting the exhaustion of consumable materials 112. In cases where execution of delivery causes an impending and economically costly delay in job execution due to uncontrollable circumstances (such as if a delivery vehicle is stuck in traffic, involved in an accident, etc.), layer 4 can preempt another automated vehicle 128 to re-route materials to a job site if the re-route is more economical. In other words, the real-time delivery and consumption data 126 maintained by the monitoring system 124 can be used to track the consumption of consumable material 112 which can be compared to the delivery schedule 116 to identify deviations from the delivery schedule 116 to be implemented. Based on this comparison the delivery schedule 116 can be adjusted to accommodate the deviations.

The delivery schedule 116 can also be affected by the job itself. For example, delays at the location (i.e., absent employee) can affect the delivery schedule 116.

Figure 2:
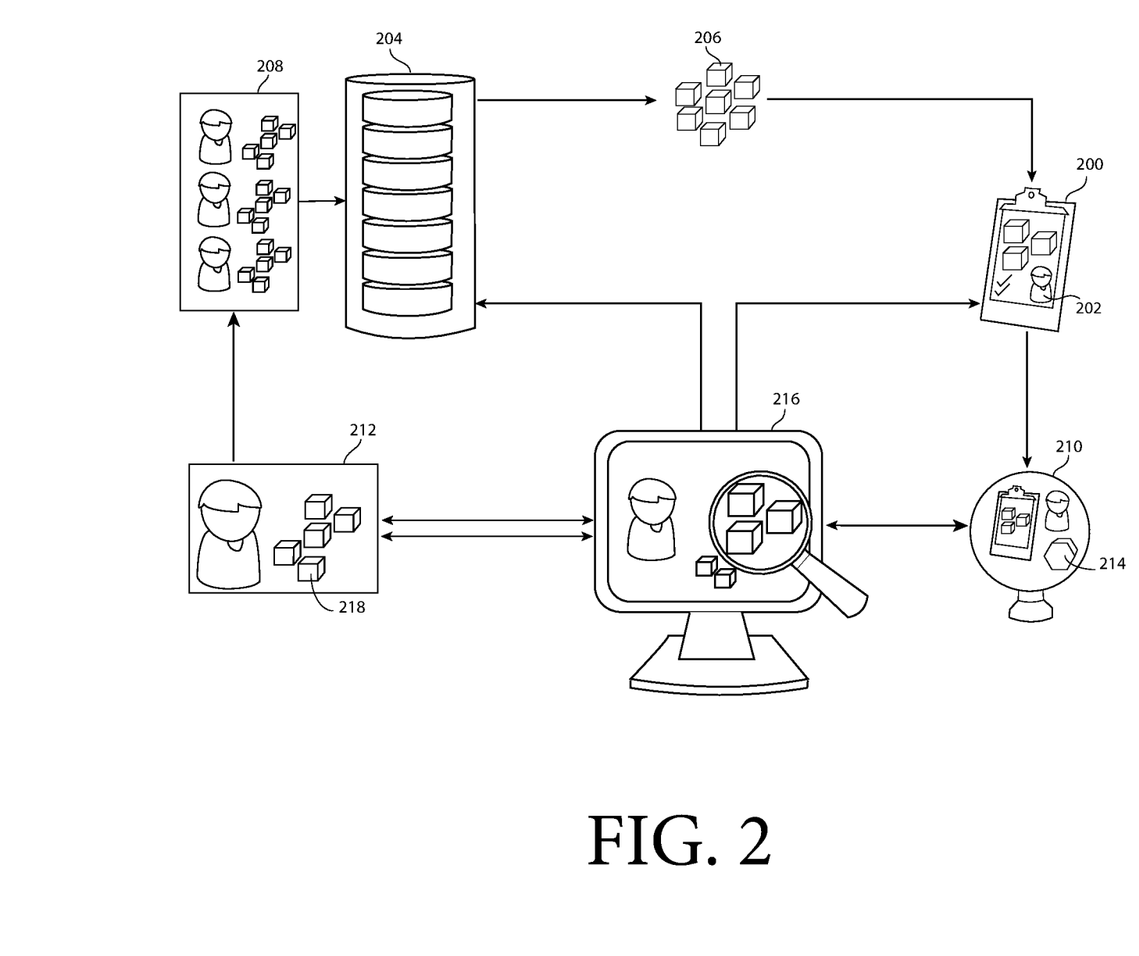
FIG. 2 is a diagram showing a method of performing a job and adjusting in real time an execution schedule for performing the job.

FIG. 2 is a diagram showing a method of performing a job and adjusting in real time an execution schedule for performing the job. As illustrated in FIG. 2, determining the consumption schedule 200 of a job 202 may include obtaining from a repository 204 a plurality of historical data 206 collected during execution of a plurality of jobs 208. In one or more embodiments, the method may include managing the rate of consumption of the consumable materials 112 (discussed above). The method may include managing a team of employees that provide services at the location in which the consumable materials 112 are delivered.

In one or more embodiments, the repository 204 is a database. The repository 204 may be a relational database or, in other embodiments, an SQL database. In one or more embodiments, the database 204 is a non-relational database and may be or include a DFS. The repository 204 may also be a physical hard-drive that stores a variety of information, such as document files, video and audio files, metadata files, etc.

Once the consumption schedule 200 is completed, an execution schedule 210 to perform a new job 212 is predicted. The prediction may be based on the historical data 206. As part of the prediction process, a contingency plan 214 is also generated based on the consumption schedule 200 and/or the historical data 206. The contingency plan 214 may also be based on current data, such as weather, traffic, accident on job, or other such delays collected using conventional technology.

When the prediction is completed and the new job 212 is being performed, the consumption schedule 200 and the execution schedule 210 may be adjusted based on real-time data 216. The real-time data 216 may be received in a variety of ways, including a personal digital assistant, a personal computer, a video monitoring system, a two-way radio device, or the like. When the real-time data 216 is collected, it may simultaneously be used to update the repository 204 with the new data, which could subsequently allow for the redetermination of the consumption schedule 200 and the execution schedule 210. In one or more embodiments, new data 218 (i.e., similar to historical data 206) becomes part of the data collected from the plurality of jobs 208, which is subsequently stored in the repository 204.

Figure 3:
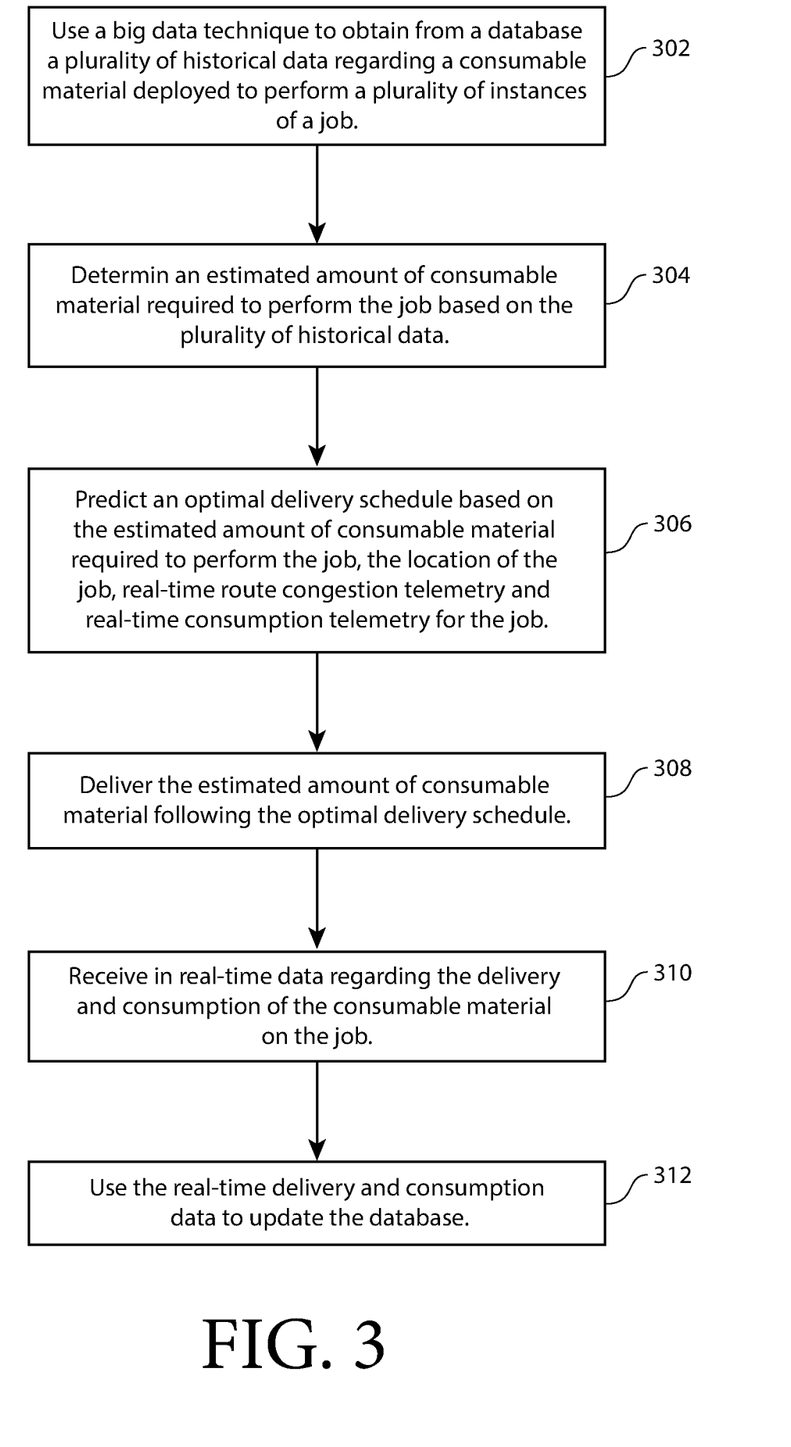
FIG. 3 is a flow chart showing a method of deploying consumable material and adjusting a deployment schedule in real time.

FIG. 3 is a flow chart showing a method of deploying consumable material and adjusting the deployment schedule in real-time. In operation, a big data technique (such as big data technique 106) is used to obtain from a database (such as database 102) a plurality of historical data (such as historical data 110) regarding a consumable material (such as consumable material 112) deployed to perform a plurality of instances of a job (block 302). An estimated amount of consumable material required to perform the job (such as estimated amount of consumable material required to perform the job 114) is determined based on the plurality of historical data (such as historical data 110)(block 304). An optimal delivery schedule (such as delivery schedule 116) is predicted based on the estimated amount of consumable material required to perform the job (such as estimated amount of consumable material required to perform the job 114), the location of the job, real-time route congestion telemetry and real-time consumption telemetry for the job (block 306). The estimated amount of consumable material (such as estimated amount of consumable material to perform the job 114) is delivered (such as delivered 122) following the optimal delivery schedule (such as delivery schedule 116)(block 308). Real-time data (such as real-time telemetry from sensors and work-supplied data 118) is received regarding the delivery (such as delivered 122) and consumption of the consumable material (such as consumable material 112) on the job (block 310). The real-time delivery and consumption data (such as real-time delivery and consumption data 126) is used to update the database (such as database 102)(block 312).

Figure 4:
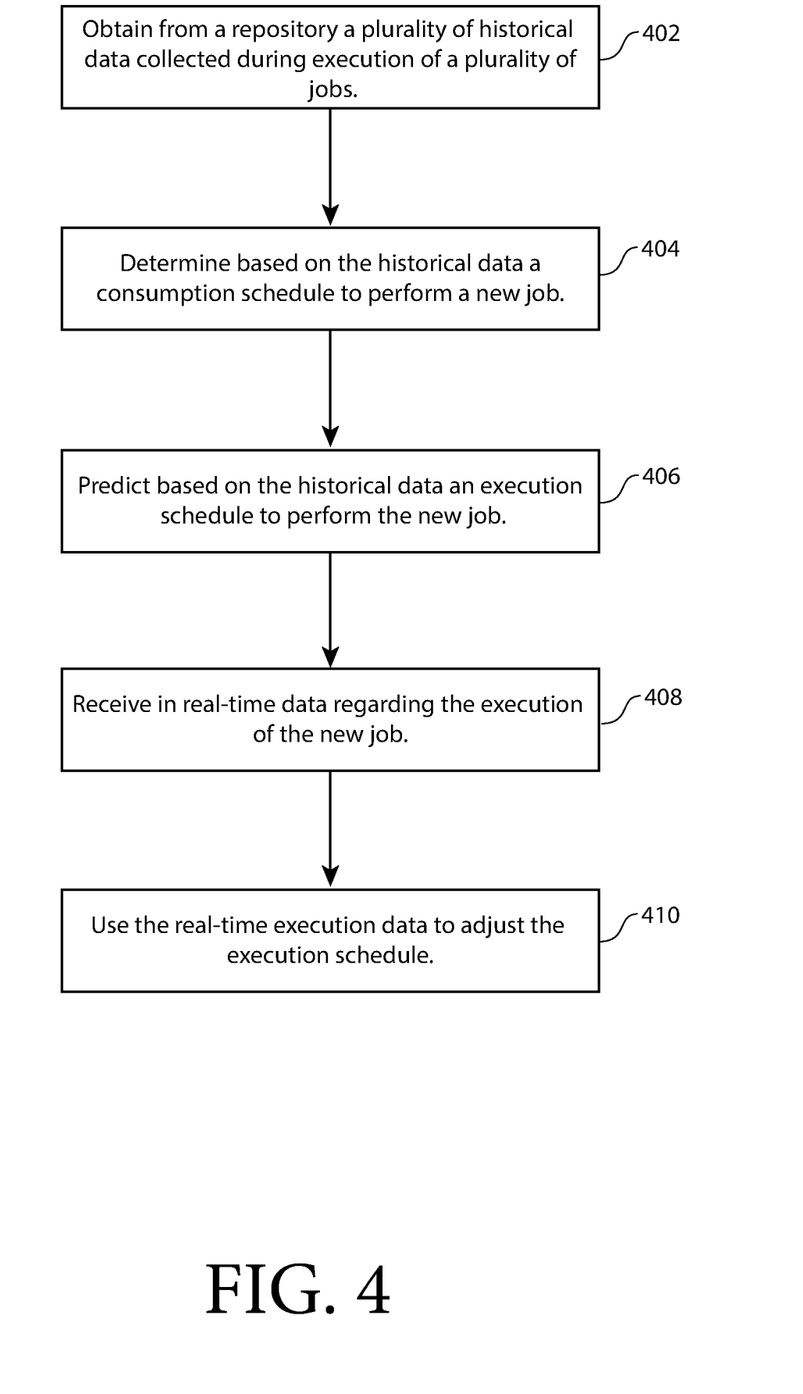
FIG. 4 is a flow chart showing a method of performing a job and adjusting in real time an execution schedule for performing the job.

FIG. 4 is a flow chart showing a method of performing a job and adjusting in real time an execution schedule for performing the job. In operation, a plurality of historical data (such as historical data 206) collected during execution of a plurality of jobs (such as job 202) is obtained from a repository (such as repository 204)(block 402). Based on the historical data (such as historical data 206) a consumption schedule (such as consumption schedule 200) to perform a new job (such as new job 212) is determined (block 404). Based on the historical data (such as historical data 206) an execution schedule (such as execution schedule 210) to perform the new job (such as new job 212) is predicted (block 406). Real-time data (such as real-time data 216) regarding the execution of the new job (such as new job 212) is received (block 408). The real-time execution data (such as real-time data 216) is used to adjust the execution schedule (such as execution schedule 210)(block 410).

In one aspect, a method includes using a big data technique to obtain from a database a plurality of historical data regarding a consumable material deployed to perform a plurality of instances of a job. An estimated amount of consumable material required to perform the job based on the plurality of historical data is determined. An optimal delivery schedule based on the estimated amount of consumable material required to perform the job, the location of the job, real-time route congestion telemetry and real-time consumption telemetry for the job is predicted. The estimated amount of consumable material following the optimal delivery schedule is delivered. The data regarding the delivery and consumption of the consumable material on the job is received in real-time. The real-time delivery and consumption data is used to update the database.

Implementation may include one or more of the following. Predicting an optimal delivery schedule may include generating a contingency plan based on the estimated amount of consumable material required to perform the job, the location of the job, real-time route congestion telemetry, real-time consumption telemetry for the job, and personnel available during the execution of the job. Delivering the estimated amount of consumable material following the optimal delivery schedule may include making deliveries of the consumable material following the optimal delivery schedule using an autonomous vehicle. Using the real-time delivery and consumption data to update the database may include using the real-time data to track the consumption of the consumable material, comparing the tracked consumption of the consumable material to the optimal delivery schedule to identify deviations from the optimal delivery schedule to be implemented, and adjusting the optimal delivery schedule to accommodate the deviations. Using the real-time delivery and consumption data to update the database may include using the real-time data to track the consumption of the consumable material and comparing the tracked consumption of the consumable material to the optimal delivery schedule to create a schedule to replenish the consumable material. The consumable material may be tagged with a tagging device selected from the group consisting of a radio frequency identification device and a global positioning system device to facilitate receiving data regarding the delivery and consumption of the consumable material on the job. Receiving data regarding the delivery and consumption of the consumable material on the job may include receiving data from a data source selected from the group consisting of a personal digital assistant, a video monitoring system, feeds from a delivery service, reports regarding failure of equipment used for the job, and reports regarding failures of personnel used for the job.

In one aspect, a method includes obtaining from a repository a plurality of historical data collected during execution of a plurality of jobs. Based on the historical data a consumption schedule is determined to perform a new job. Based on the historical data an execution schedule is predicted to perform the new job. Data regarding the execution of the new job is received in real-time. The real-time execution data is used to adjust the execution schedule.

Implementations may include one or more of the following. The repository may include a database. Predicting a schedule required to perform the job may include generating a contingency plan based on the historical data required to perform the job. Receiving data in real time may include receiving real-time data from a data source selected from the group consisting of a personal digital assistant, a personal computer, a video monitoring system, and a two-way radio device. The real-time execution data may be used to adjust the consumption schedule. The method may include updating the repository using the received real-time data, re-determining the consumption schedule, and re-predicting the execution schedule.

In one aspect, a method includes a non-transitory computer-readable medium on which is recorded a computer program, the computer program comprising executable instructions, that, when executed, perform a method using a big data technique to obtain from a database a plurality of historical data regarding a consumable material deployed to perform a plurality of instances of a job. An estimated amount of consumable material required to perform the job based on the plurality of historical data is determined. An optimal delivery schedule based on the estimated amount of consumable material required to perform the job, the location of the job, real-time route congestion telemetry and real-time consumption telemetry for the job is predicted. The estimated amount of consumable material following the optimal delivery schedule is determined. The data regarding the delivery and consumption of the consumable material on the job is received in real-time. The real-time delivery and consumption data is used to update the database.

Implementation may include one or more of the following. Predicting an optimal delivery schedule may include generating a contingency plan based on the estimated amount of consumable material required to perform the job, the location of the job, real-time route congestion telemetry, real-time consumption telemetry for the job, and personnel available during the execution of the job. Delivering the estimated amount of consumable material following the optimal delivery schedule may include making deliveries of the consumable material following the optimal delivery schedule using an autonomous vehicle. Using the real-time delivery and consumption data to update the database may include using the real-time data to track the consumption of the consumable material, comparing the tracked consumption of the consumable material to the optimal delivery schedule to identify deviations from the optimal delivery schedule to be implemented, and adjusting the optimal delivery schedule to accommodate the deviations. Using the real-time delivery and consumption data to update the database may include using the real-time data to track the consumption of the consumable material and comparing the tracked consumption of the consumable material to the optimal delivery schedule to create a schedule to replenish the consumable material. The consumable material may be tagged with a tagging device selected from the group consisting of a radio frequency identification device and a global positioning system device to facilitate receiving data regarding the delivery and consumption of the consumable material on the job. Receiving data regarding the delivery and consumption of the consumable material on the job may include receiving data from a data source selected from the group consisting of a personal digital assistant, a video monitoring system, feeds from a delivery service, reports regarding failure of equipment used for the job, and reports regarding failures of personnel used for the job.

References in the specification to "one or more embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of deploying consumable material comprising:
   deploying first layer stage comprising a predictive model, the predictive model comprising
      accessing a database with a big data technique to obtain from a plurality of data stores a set of historical data comprising a consumable material deployed to perform a plurality of historical jobs, the historical jobs being one or more of drilling, workover, or fracking, and the big data technique comprising a relational data base accessed via Structured Query Language (SQL) or non-relational database comprising a distributed file system,
      finding similar historical jobs to jobs being planned based on parameters of the historical jobs,
      predicting a rate at which the consumables are expected to be consumed for jobs being planned based on the parameters of the historical jobs, and
      determining an estimated amount of consumable material required to perform the jobs being planned based on the predicted rate;
   deploying a second layer stage comprising predicting quantities of consumable material required to perform the jobs being planned, the predicting quantities of consumable material being based on the estimated amount of consumable material required to perform the jobs being planned, estimating initial quantities of consumables required per job site for the jobs being planned, the expected rate of consumption and the capability of replenishing the materials before a job location for the jobs being planned exhausts an on-hand quantity of consumable materials;

deploying third layer stage comprising predicting an optimal delivery schedule based on the predicted quantities of consumable material required to perform the jobs being planned, the location of the jobs being planned, real-time route congestion telemetry and real-time consumption telemetry for jobs being planned; and deploying fourth layer stage comprising executing delivery, the executing delivery comprising
  delivering, to one or more of the jobs that were planned, the predicted quantities of consumable material following the optimal delivery schedule, and
  monitoring, via a sensor, in real-time data regarding the delivery and consumption of the consumable material on the job; and using the real-time delivery and consumption data to update the database.

2. The method of claim 1 wherein predicting an optimal delivery schedule comprises generating a contingency plan based on the estimated amount of consumable material required to perform the job, the location of the job, real-time route congestion telemetry, real-time consumption telemetry for the job, and personnel available during the execution of the job.

3. The method of claim 1 wherein delivering the estimated amount of consumable material following the optimal delivery schedule comprises making deliveries of the consumable material following the optimal delivery schedule using an autonomous vehicle.

4. The method of claim 1 wherein using the real-time delivery and consumption data to update the database comprises:
  using the real-time data to track the consumption of the consumable material;
  comparing the tracked consumption of the consumable material to the optimal delivery schedule to identify deviations from the optimal delivery schedule to be implemented; and
  adjusting the optimal delivery schedule to accommodate the deviations.

5. The method of claim 1 wherein using the real-time delivery and consumption data to update the database comprises:
  using the real-time data to track the consumption of the consumable material; and
  comparing the tracked consumption of the consumable material to the optimal delivery schedule to create a schedule to replenish the consumable material.

6. The method of claim 1 further comprising tagging the consumable material with a tagging device selected from the group consisting of a radio frequency identification device and a global positioning system device to facilitate receiving data regarding the delivery and consumption of the consumable material on the job.

7. The method of claim 1 wherein receiving data regarding the delivery and consumption of the consumable material on the job comprises receiving data from data source selected from the group consisting of a personal digital assistant, a video monitoring system, feeds from a delivery service, reports regarding failure of equipment used for the job, personal computer, and reports regarding failures of personnel used for the job.

8. The method of claim 1, wherein the big data technique comprises the relational data base accessed via the Structured Query Language (SQL).

9. The method of claim 1, wherein the big data technique comprises the non-relational database comprising the distributed file system.

10. The method of claim 1,
  wherein the second layer stage overlaps the first layer stage such that the determining an estimated amount of consumable material required to perform the jobs being planned is further determined based on the set of historical data,
  the second layer stage overlaps the third layer stage such that the predicting quantities of consumable material is further determined based on the optimal delivery schedule,
  and the third layer stage overlaps the fourth layer stage such that predicting the delivery schedule is further determined based on information about the delivery and consumption of the consumable material,
  and the fourth layer stage overlaps the first layer stage such that the real-time delivery and consumption data is updated to the data stores of the database.

11. A non-transitory computer-readable medium on which is recorded a computer program, the computer program comprising executable instructions, that, when executed, perform a method comprising:
  deploying first layer stage comprising a predictive model, the predictive model comprising
    accessing a database with a big data technique to obtain from a plurality of data stores a set of historical data comprising historical jobs
  a consumable material deployed to perform a plurality of, the historical jobs being one or more of drilling, workover, or fracking, and the big data technique comprising a relational data base accessed via Structured Query Language (SQL) or non-relational database comprising a distributed file system;
    finding similar historical jobs to jobs being planned based on parameters of the historical jobs,
    predicting a rate at which the consumables are expected to be consumed for jobs being planned based on the parameters of the historical jobs, and
    determining an estimated amount of consumable material required to perform the jobs being planned based on the predicted rate;
  deploying a second layer stage comprising predicting quantities of consumable material required to perform the jobs being planned, the predicting quantities of consumable material being based on the estimated amount of consumable material required to perform the jobs being planned, estimating initial quantities of consumables required per job site for the jobs being planned, the expected rate of consumption and the capability of replenishing the materials before a job location for the jobs being planned exhausts an on-hand quantity of consumable materials;
  deploying third layer stage comprising predicting an optimal delivery schedule based on the predicted quantities of consumable material required to perform the jobs being planned, the location of the jobs being planned, real-time route congestion telemetry and real-time consumption telemetry for jobs being planned; and
  deploying fourth layer stage comprising executing delivery, the executing delivery comprising delivering, to one or more of the jobs that were planned, the predicted quantities of consumable material following the optimal delivery schedule, and monitoring, via a sensor, in real time data regarding the delivery and consumption of the consumable material on the job; and using the real-time delivery and consumption data to update the database.

12. The non-transitory computer-readable medium of claim 11 wherein predicting an optimal delivery schedule comprises generating a contingency plan based on the estimated amount of consumable material required to perform the job, the location of the job, real-time route congestion telemetry, real-time consumption telemetry for the job, and personnel available during the execution of the job.

13. The non-transitory computer-readable medium of claim 11 wherein delivering the estimated amount of consumable material following the optimal delivery schedule comprises making deliveries of the consumable material following the optimal delivery schedule using an autonomous vehicle.

14. The non-transitory computer-readable medium of claim 11 wherein using the real-time delivery and consumption data to update the database comprises:

using the real-time data to track the consumption of the consumable material;

comparing the tracked consumption of the consumable material to the optimal delivery schedule to identify deviations from the optimal delivery schedule to be implemented; and adjusting the optimal delivery schedule to accommodate the deviations.

15. The non-transitory computer-readable medium of claim 11 wherein using the real-time delivery and consumption data to update the database comprises:

using the real-time data to track the consumption of the consumable material; and comparing the tracked consumption of the consumable material to the optimal delivery schedule to create a schedule to replenish the consumable material.

16. The non-transitory computer-readable medium of claim 11 wherein the method further comprises tagging the consumable material with a tagging device selected from the group consisting of a radio frequency identification device and a global positioning system device to facilitate receiving data regarding the delivery and consumption of the consumable material on the job.

17. The non-transitory computer-readable medium of claim 11 wherein receiving data regarding the delivery and consumption of the consumable material on the job comprises receiving data from data source selected from the group consisting of a personal digital assistant, a video monitoring system, feeds from a delivery service, reports regarding failure of equipment used for the job, and reports regarding failures of personnel used for the job.

* * * * *